US012801476B2

(12) United States Patent
Reddy et al.

(10) Patent No.: US 12,801,476 B2
(45) Date of Patent: Nov. 17, 2026

(54) TRAINING MODELS FOR TARGET COMPUTING DEVICES

(71) Applicant: Peridot Print LLC, Palo Alto, CA (US)

(72) Inventors: Prakash Reddy, Palo Alto, CA (US); Amit Kumar, Bangalore (IN); Utkarsh Siddu, Bangalore (IN); Debjit Roy, Bangalore (IN); Hariharan Rajaram, Bangalore (IN)

(73) Assignee: Peridot Print LLC, Palo Alto, CA (US)

( * ) Notice: Subject to any disclaimer, the term of this patent is extended or adjusted under 35 U.S.C. 154(b) by 751 days.

(21) Appl. No.: 18/267,347

(22) PCT Filed: Dec. 17, 2020

(86) PCT No.: PCT/US2020/065595
§ 371 (c)(1),
(2) Date: Jun. 14, 2023

(87) PCT Pub. No.: WO2022/132155
PCT Pub. Date: Jun. 23, 2022

(65) Prior Publication Data

US 2024/0054341 A1 Feb. 15, 2024

(51) Int. Cl.
*G06F 11/07* (2006.01)

(52) U.S. Cl.
CPC .................................. *G06F 11/079* (2013.01)

(58) Field of Classification Search
CPC ............... G06F 11/079; G06F 11/0793; G06F 11/0751; G06F 11/3013; G06F 11/3058; G06N 20/00; G06N 20/10; G06N 20/20
USPC ....... 714/26, 25, 47.1, 47.2, 47.3; 706/25, 2, 706/16, 21, 46–48, 52
See application file for complete search history.

(56) References Cited

U.S. PATENT DOCUMENTS

| | | | |
|---|---|---|---|
| 6,845,289 B2 | 1/2005 | Salewski et al. | |
| 7,233,886 B2 | 6/2007 | Wegerich et al. | |
| 10,102,056 B1 | 10/2018 | Goldberg | |
| 12,265,446 B1 * | 4/2025 | Callot | G06F 11/0793 |
| 2014/0279779 A1 | 9/2014 | Zou et al. | |
| 2016/0147583 A1 | 5/2016 | Ben Simhon et al. | |
| 2016/0193790 A1 | 7/2016 | Shuck et al. | |
| 2016/0371170 A1 | 12/2016 | Salunke et al. | |
| 2019/0163848 A1 | 5/2019 | Mcgranahan et al. | |

(Continued)

OTHER PUBLICATIONS

Baena et al., "Machine Learning-based Approach to Detect Online Performance Problems in Distributed Systems," 2019 Congreso Internacional de InnovaciÃ³n y Tendencias en Ingenieria (CONIITI ), Bogota, Colombia, 2019, pp. 1-6, doi: 10.1109/CONIITI48476.2019.8960794. (Year: 2019).*

*Primary Examiner* — Chae M Ko
(74) *Attorney, Agent, or Firm* — Law Offices of Michael Dryja; Michael Dryja

(57) ABSTRACT

Examples of analyzing a plurality of operating parameters of a computing device are described. In an example, current operating parameters of a target computing device may be analyzed based on a first model and a second model. A first model may be trained based on a set of environment-related parameters. A second model may incorporate a set of global weights, wherein the global weights may be based on a set of environment-agnostic parameters.

14 Claims, 7 Drawing Sheets

(56) References Cited

U.S. PATENT DOCUMENTS

| | | | | |
|---|---|---|---|---|
| 2019/0384255 | A1 | 12/2019 | Krishnaswamy et al. | |
| 2020/0117530 | A1 * | 4/2020 | Baron | G06F 11/0709 |
| 2020/0344252 | A1 * | 10/2020 | Menon | G06F 11/3006 |
| 2021/0042843 | A1 * | 2/2021 | Bryant | G06Q 40/08 |
| 2021/0281590 | A1 * | 9/2021 | Maha | H04L 43/0876 |
| 2022/0260973 | A1 * | 8/2022 | Swank | G05B 15/02 |
| 2023/0161662 | A1 * | 5/2023 | Wollny | G06F 11/004<br>714/48 |

* cited by examiner

TRAINING MODELS FOR TARGET COMPUTING DEVICES

BACKGROUND

A computing device may operate under a variety of conditions. The operation of the computing device may be monitored for detecting any anomalous behavior. In such cases, operating parameters associated with the computing device may be monitored. Operating parameters may refer to values of device attributes which may define an operational state of the computing device being monitored. In certain instances, such parameters may be monitored through sensors provided within the computing device. Any deviation in the values of the operating parameters may indicate an occurrence of an anomaly.

BRIEF DESCRIPTION OF DRAWINGS

The following detailed description references the drawings, wherein.

Figure 1:
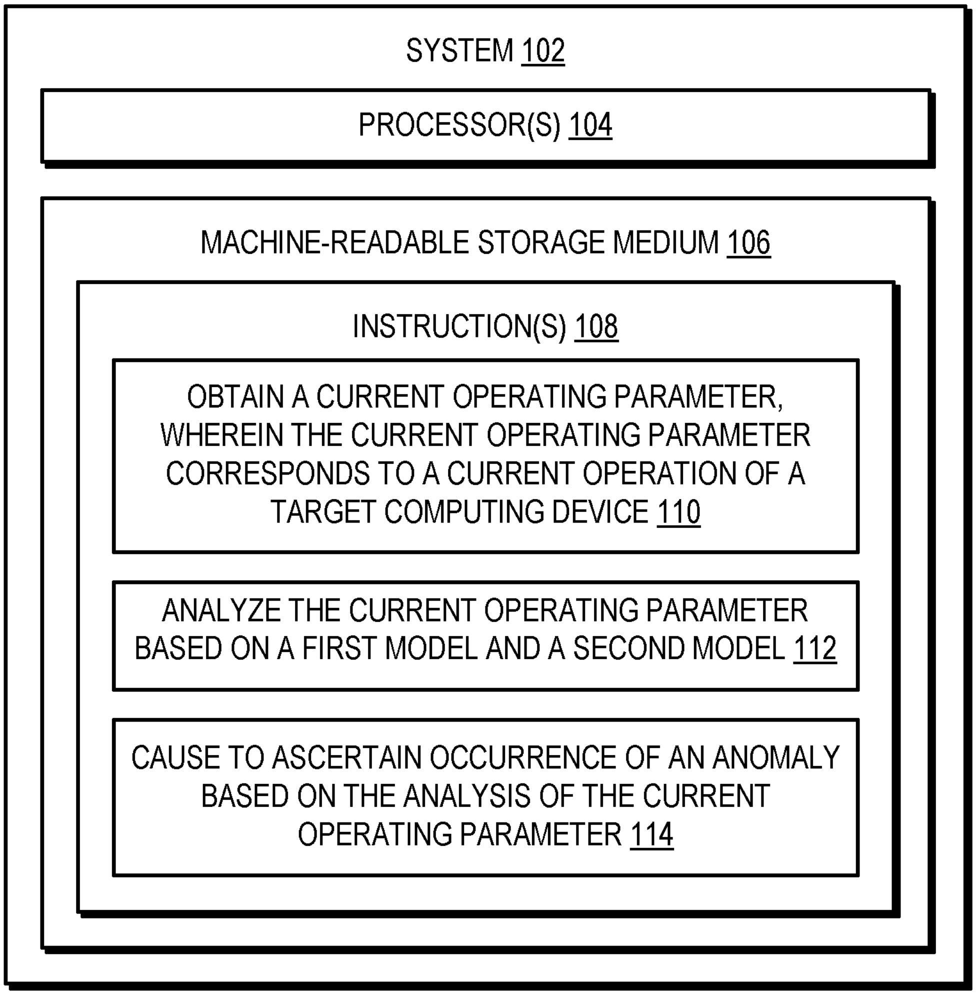
FIG. 1 illustrates an example system for determining an occurrence of an anomaly in a target computing device, based on a first model and a second model, according to an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

A variety of computing devices may be used for performing different functions. Such computing devices may operate as part of a networking environment, within which the operation of such computing devices may be monitored. Monitoring enables detection of any anomalous operation of any one of the computing devices. Such anomalous operation, if detected in time, may be corrected and any adverse impact that may be caused as a result of such an anomaly, may be averted. For example, in a manufacturing process implemented through computing systems, occurrence of any anomaly once detected, may be resolved to ensure that no adverse impact occurs during the manufacturing process.

The operation and functioning of such computing devices may depend on a number of operating parameters. As a result, it may be challenging to monitor all such operating parameters for detecting anomalies that may occur during the operation of a computing device under consideration. Machine learning techniques may provide mechanisms by way of which the operation of such computing devices may be monitored for anomalies to be predicted. In such cases, a machine learning model may be initially trained for assessing current operation parameters of computing devices and accordingly predict occurrences of any anomalies within the computing device. Such techniques involve training the machine learning model.

Before a machine learning model may be used, it may be trained based on data corresponding to other computing devices. For example, training a machine learning model may involve using large data sets from various other computing devices in a network. This may involve transmitting large volumes of datasets to a central computing device where the machine learning model may be trained. This may result in the central computing device being computationally burdened with large volumes of data from different devices. Furthermore, transmission of large datasets may also create privacy and confidentiality concerns, particularly in instances where personal data is involved.

Federated learning techniques address such challenges to some extent. In this context, multiple computing devices may be implemented with a local model. The local model may be then trained based on the locally generated data (referred to as local data) of the computing device. In a similar manner, other local models of other computing devices may be trained. With the local models trained, weights associated with the trained models may be obtained and communicated to a central computing device which implements a global model. Weights may refer to learnable parameters of a trainable machine learning model (like the local model) which are defined based on the training data. In the present context, the local model is trained based on device related parameters for different computing devices.

Thereafter, the global model may be trained based on the weights provided by the multiple computing devices. With the global model trained, global weights may be derived from the global model and may be transmitted to the multiple computing devices. These global weights may then be incorporated into the local model or may be used to update the local model. The local model may then be utilized for monitoring the operation of the respective computing devices for predicting anomalies during the operation of such computing devices.

Although federated learning may address most concerns related to large volumes of data being analyzed centrally, such techniques may not consider the nature of local data which is generated by the respective computing devices. For example, certain sets of the local data may correspond to operational parameters that may be affected by local environmental factors or conditions of the computing device under consideration. The remaining data (from the local data) may correspond to other operational parameters that are unrelated to or not affected by the local environmental factors or conditions of the computing device. Owing to such a mixed nature of the locally generated data, the accuracy of the trained model to predict occurrence of anomalies may be less.

Furthermore, in certain instances, the computing devices may not possess sufficient computational resources locally to train the local model based on the locally generated data. In such cases, the data of such computing devices may not be factored which in turn may impact the accuracy of any model for monitoring and detecting occurrence of anomalies.

Approaches for predicting anomalies in a target computing device, based on a first model and a second model, are described. In this context, the first model may be used for predicting anomalies based on environment-related parameters, whereas the second model may be used for predicting anomalies based on environment-agnostic parameters. In an example, the environment-related parameters are such parameters of the target computing device which may be affected by local environmental factors or conditions of the target computing device. The second model may be used for predicting anomalies based on environment-agnostic parameters, which may result from factors that are not affected by local environmental factors or conditions.

The first model and the second model may be initially trained before they may be used to predict anomalies. In an example, the first model may be trained based on environment-related parameters of a given computing device, to the exclusion of other computing devices. On the other hand, the second model may be initially trained based on environment-agnostic parameters. Once trained, model weights may be derived from the second model and transmitted to a central computing system, which in turn implements a global model. The global model may then be trained based on the model weights shared with the central computing system. Once trained, global weights may be derived from the global model and transmitted to the computing devices within a network. Based on the global weights, the second model on the computing devices may be updated. In an example, the second model may be periodically receiving a subsequent global weights from central computing system, based on which the second model may be periodically updated. The model weights, in an example, correspond to and are determined based on environment-agnostic parameters. The environment-agnostic parameters may be considered as parameters which correspond to operations of computing devices which may be less impacted or in some cases, unaffected by environmental factors or conditions of such computing devices.

The first model and the second model may be incorporated in a testing system which then monitors the target computing device. In another example, the first model and the second model may be implemented in the target computing device. In either case, the operation of a target computing device may then be monitored based on the first model and the second model. Examples of a target computing device include an additive manufacturing device (i.e., a 3D printer), a sensor-based device, various other types of computing devices, or any electronic or mechanical device capable of generating and transmitting operating data pertaining to their operation.

In operation, current operating parameters of the target computing device may be analyzed based on the first model and the second model. The current operating parameters may refer to parameters corresponding to real-time operation of the target computing device. Based on the analysis of the current operating parameters, occurrence of anomalies may be ascertained. Since the assessment is performed based on the environment-related parameters (i.e., by the first model) and the environment-agnostic parameters (i.e., by the second model) separately, the resulting prediction is more accurate.

Further, since the model weights are transmitted to the central computing system instead of the data pertaining to operating parameters, the approaches of the present subject matter may reduce the volumes of data being communicated to the central computing system. Furthermore, transmission of model weights as opposed to actual data may provide additional security while handling large volumes of personal data of different users using the computing devices.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

The manner in which the example computing devices are implemented are explained in detail with respect to FIGS. 1-7. While aspects of described computing device may be implemented in any number of different electronic devices, environments, and/or implementations, the examples are described in the context of the following example device(s). It is to be noted that drawings of the present subject matter shown here are for illustrative purposes and are not to be construed as limiting the scope of the subject matter claimed.

FIG. 1 illustrates an example system 102 for determining an occurrence of an anomaly in a target computing device, based on a first model and a second model, according to an example of the present subject matter. The system 102 includes a processor 104, and a machine-readable storage medium 106 which is coupled to, and accessible by, the processor 104. The system 102 may be a computing system, such as a storage array, server, desktop or a laptop computing device, a distributed computing system, or the like. Although not depicted, the system 102 may include other components, such as interfaces to communicate over a network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM, or non-volatile memory such as EPROM, flash memory, and the like. The instructions 108 may be executed to determine occurrence of an anomaly in the target computing device, based on the analysis of the current operating parameters of the target computing device.

In an example, the processor 104 may fetch and execute instructions 108. For example, as a result of the execution of instructions 110, a current operating parameter of a target computing device may be obtained. The current operating parameter may correspond to parameters that correspond to current operation of the target computing device, that may be underway and that may be occurring in real-time. Certain parameters of the computing device may be such, that they may be affected by the environmental conditions. The operational parameters, in such cases, may refer to values of such computing device attributes. Examples of such parameters may include, but are not limited to, core temperatures, operating humidity, power level, number of users, amount of data being processed, type of data being processed, and operating time of the target computing device.

The current operating parameter may be analyzed based on a first model and a second model, as a result of the execution of instructions 112. The first model may be trained based on environment-related parameters. The environment-related factors may be related to, or dependent on, the environmental conditions under which the target computing device is operating. These conditions may be specific to the target computing device and may have an impact on the operation of the target computing device. Other devices may be subjected to other environmental conditions. For example, it may be the case that the target computing device may be operating in a location, where the ambient temperatures are above a threshold value. In such cases, high ambient temperature in the vicinity of the target computing device, may have an impact on the functioning of processor units of the target computing device.

On the other hand, the second model may incorporate a first set of global weights derived from a global model. As will be explained in detail later, the global model, in an example, may be trained on a central computing system based on model weights which in turn are derived based on a set of environment-agnostic parameters from the second model. Once trained based on model weights, global weights from the global model may be obtained, and transmitted to the computing devices. The second model may be then updated based on the global weights.

With the current operating parameters of the target computing device analyzed based on the first model and the second model, the system 102 may determine an occurrence of an anomaly. In an example, instructions 114, when executed, may determine an occurrence of an anomaly in the target computing device based on the analysis of current operational parameter of the target computing device by the first model and the second model. In an example, based on the first model and the second model certain operating parameters may be predicted. Such predicted parameters may be compared with the current operating parameters. Based on the deviation between the predicted parameters and the current operating parameters, occurrence of an anomaly may be ascertained. The present approach is just one of the many other examples that may be used for determining occurrence of an anomaly. Such other approaches may be used without limiting the scope of the present subject matter.

The above described techniques implemented as a result of the execution of the instructions 108 may be performed by different programmable entities. Such programmable entities may be implemented through neural network-based computing systems, which may be implemented either on a stand-alone computing device, or multiple computing devices. As will be explained, various examples of the present subject matter are described in the context of a computing system for training a neural network-based model, and thereafter, utilizing the neural network model for determining whether an anomaly has occurred based on the analysis of the operating parameters of the target computing device. These and other examples are further described with respect to other figures.

Figure 2:
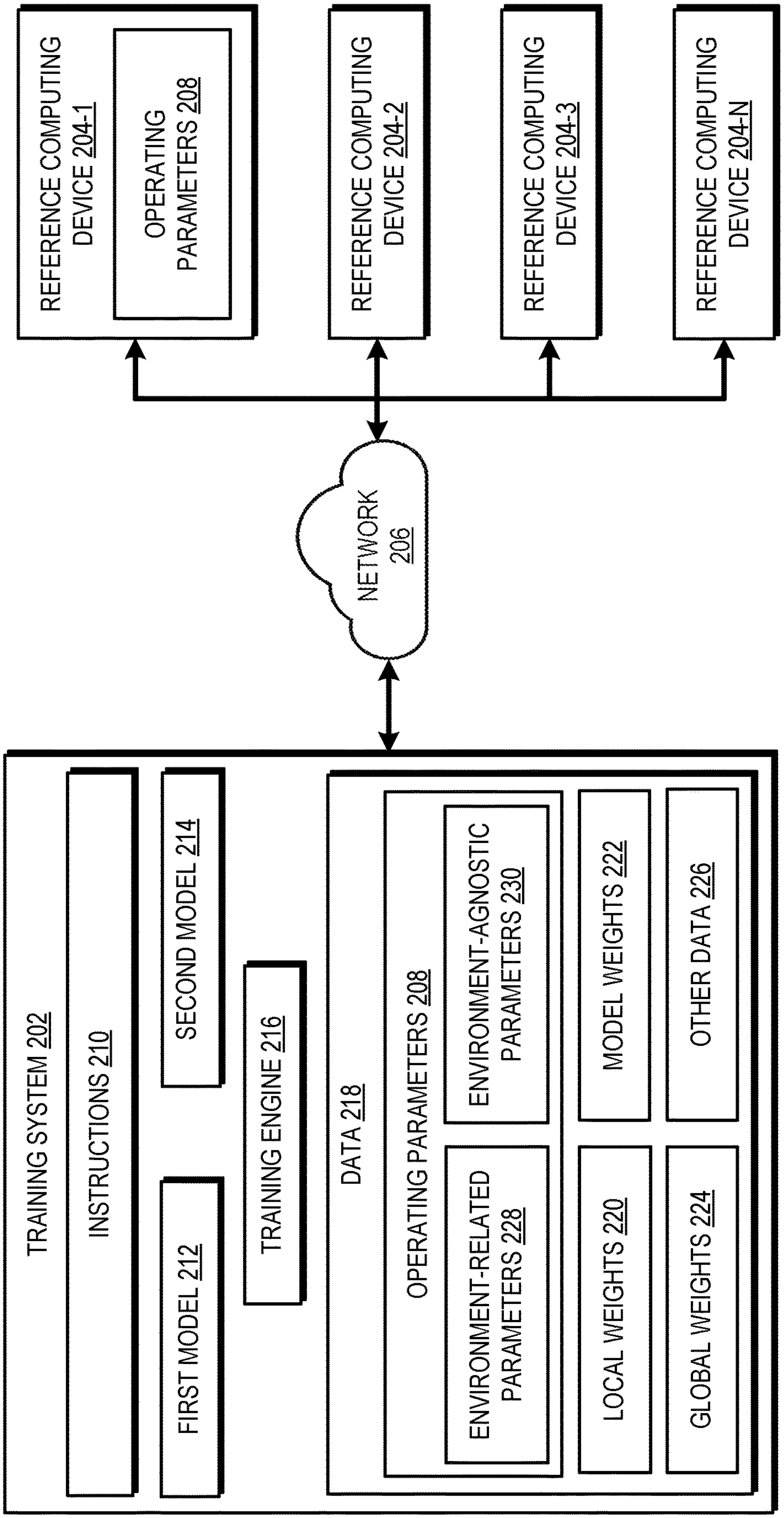
FIG. 2 illustrates a training system for training a first model and a second model, according to an example of the present subject matter.

FIG. 2 illustrates a training system 202 comprising a processor and memory (not shown), for training a first model 212 and a second model 214. In an example, the training system 202 (referred to as the system 202) may be in communication with a plurality of reference computing device(s) 204-1, 2, . . . , N (collectively referred to as reference computing devices 204) through a network 206.

The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks may include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The reference computing devices 204 may generate operating parameters 208 in course of executing various operations. The system 202 may further include instructions 210 for training a first model 212 and a second model 214 based on a set of operating parameters, such as operating parameters 208, corresponding to the operations of a computing device, such as the reference computing device 204-1. The operating parameters 208 may be data or values of different attributes pertaining to different operations that may be performed by the computing device 204-1.

Further, the system 202 may include a training engine 216. The training engine 216 (referred to as engine 216) may be implemented as a combination of hardware and programming, for example, programmable instructions to implement a variety of functionalities. In examples described herein, such combinations of hardware and programming may be implemented in several different ways. For example, the programming for the engine 216 may be executable instructions, such as instructions 210. Such instructions may be stored on a non-transitory machine-readable storage medium which may be coupled either directly with the system 202 or indirectly (for example, through networked means). In an example, the engine 216 may include a processing resource, for example, either a single processor or a combination of multiple processors, to execute such instructions. In the present examples, the non-transitory machine-readable storage medium may store instructions, such as instructions 210, that when executed by the processing resource, implement engine 216. In other examples, the training engine 216 may be implemented as electronic circuitry.

The present example is now explained with respect to the reference computing device 204-1. It may be noted that the present approaches may be extended to other reference computing devices 204, without any limitation. In operation, the training system 202 may obtain the operating parameters 208 from the reference computing device 204-1. The operating parameters 208 may be stored in data 218. The data 218 may include operating parameters 208, local weights 220, model weights 222, global weights 224, and other data 226. As described previously, the operating parameters 208 may include parameters which may be affected by local environment factors or conditions of the reference computing device 204-1. Such parameters may be categorized and stored as environment-related parameters 228. Examples of such environment-related parameters 228 may include, but are not limited to, ambient temperature, humidity, or any other parameter corresponding to the environmental conditions under which the reference computing device 204-1 may be operating. The environment-related parameters 228 may be determined from historical data corresponding to prior operations of the reference computing device 204-1.

In addition, the operating parameters 208 may include other parameters which may be minimally affected by local environment factors or conditions of the reference computing device 204-1 and may be categorized and stored as environment-agnostic parameters 230. In such instances, environmental factors or conditions have limited impact on the environment-agnostic parameters 230. Examples of such environment-agnostic parameters 230 may include, but are not limited to, volume of network traffic, type of data being processed, and numbers of user which may be serviced by the reference computing device 204-1.

To begin with, the training engine 216 of the system 202 may train the first model 212 based on the set of environmental specific features 228 of the reference computing device 204-1. Since the environment-related parameters 228 may correspond to the prior operation of the reference computing device 204-1, first model 212 gets trained based on how the reference computing device 204-1 has operated, historically. During the course of training, the training engine 216 may update the local weights 220 of the first model 212 based on the environment-related parameters 228. In one example, the local weights 220 of the first model 212 may be periodically updated and refined, based on the environmental specific features 228. While updating the first model 212, the environment-related parameters 228 corresponding to the reference computing device 204-1 are considered to the exclusion of other reference computing devices 204. As a result, training of the first model 212 on the reference computing device 204-1 is performed based on the environment-related parameters 228 of the reference computing device 204-1.

In relation to the second model 214, the training engine 216 may train the second model 214 based on the environment-agnostic parameters 230. As discussed previously, the environment-agnostic parameters 230 may correspond to operations of the reference computing device 204-1, which are less or minimally impacted from environmental factors which may be associated with it. Once the second model 214 is trained, the training engine 216 may derive model weights 222 from the second model 214. The model weights 222 may then be transmitted to a central computing system (not shown in FIG. 2) which may be remotely connected to the training system 202. The central computing system is to implement a global model (not shown in FIG. 2), which is to be trained based on the model weights 222 communicated by the reference computing device 204-1.

The above process may be repeated for other second models 214 implemented in other reference computing devices 204 (i.e., devices 204-2, 3, . . . , N), which may then communicate their respective model weights 222 to the central computing system. The central computing system may then train the global model based on the model weights 222 received from reference computing devices 204, based on which global weights may be derived. In an example, the central computing system may aggregate the various model weights 222 received from different reference computing devices 204, to determine the global weights. The global weights may then be received by the training system 202 based on which the second model 214 may be updated. In an example, the global weights may be stored within the training system 202 as global weights 224. In another example, the global weights 224 may be periodically updated by the central computing system. In the context of the present example, the subsequent set of global weights may be received by the training system 202. Based on the subsequent set of global weights, the second model 214 may be updated. In another example, the subsequent set of global weights may be validated based on predefined rules. For example, subsequent set of global weights received within a threshold time limit may not be considered. Once validated, the subsequent set of global weights may be used for updating the second model 214. The manner in which a central computing system may train a global model is described in conjunction with FIG. 3.

Figure 3:
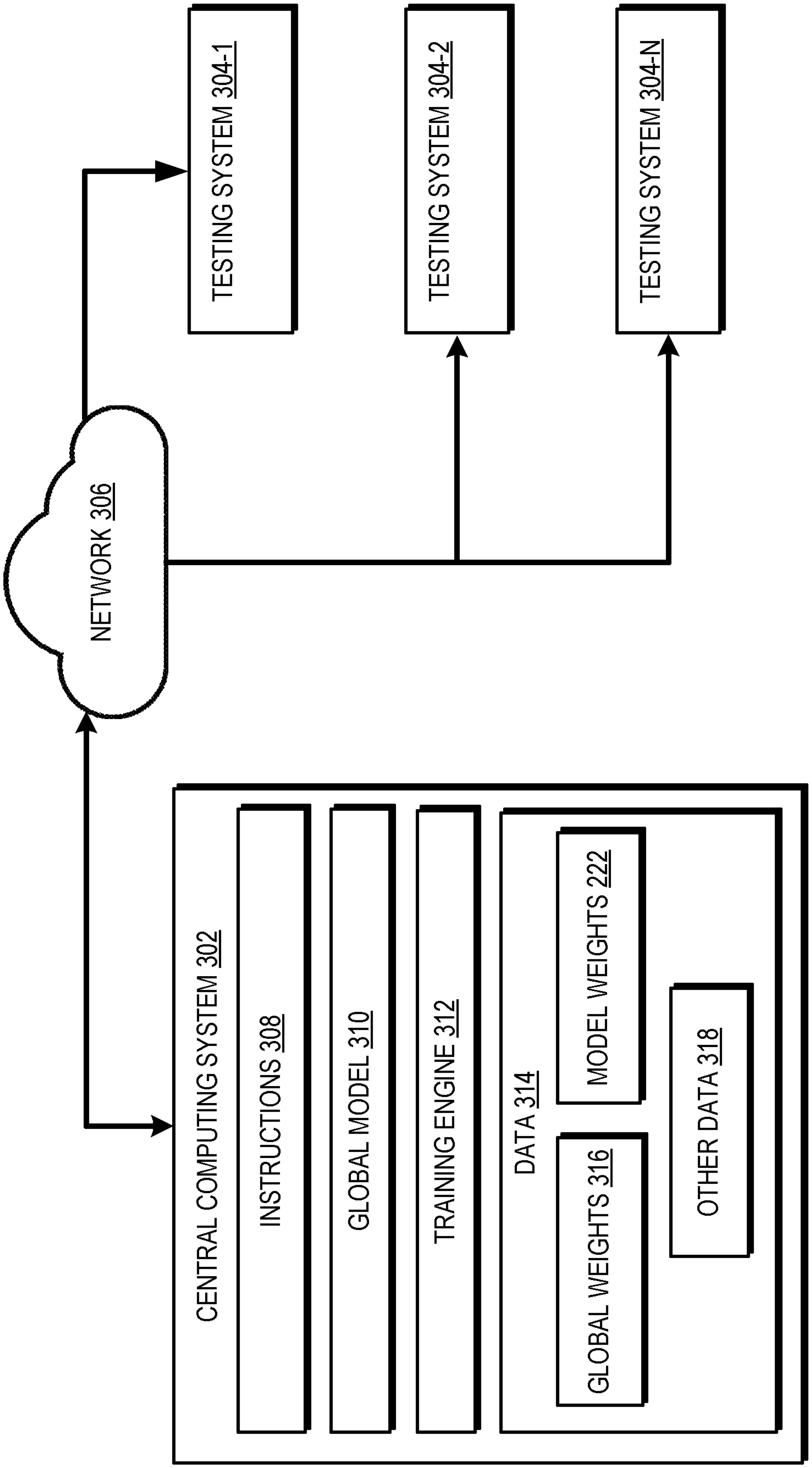
FIG. 3 illustrates a central computing system implementing a global model, according to an example of the present subject matter.

FIG. 3 illustrates a central computing system 302 which implements a global model 310. Similar to the training system 202, the system 302 may include a processor and memory (not shown) In an example, the central computing system 302 may be in communication with a plurality of testing system(s) 304-1, 304-2, . . . , 304-N (collectively referred to as testing system 304) through a network 306 (which in an example, may be similar to the network 206).

As described above in conjunction with FIG. 2, the training system 202 trained the second model 214, based on which the model weights 222 were generated. The model weights 222 thus generated were obtained by the central computing system 302. The central computing system 302 may further include instructions 308 for training a global model 310 based on the model weights 222, received from the training system 202. The model weights 222, in an example, is stored in data 314. The data 314 in turn may include global weights 316 and other data 318. In the context of the present example and the example training system 202, the model weights 222 include weights obtained from any one or more of the reference computing devices 204.

Continuing with the present example, the central computing system 302 may include a training engine 312. The training engine 312 may be implemented in a similar manner as engine 216, as described in conjunction with FIG. 2. In operation, instructions 308, when executed, may cause the training engine 312 to train the global model 310 based on the received model weights 222 (e.g., received from the training system 202 as described in FIG. 2). With the global model 310 trained, the training engine 312 may determine global weights 316 from the global model 310. In an example, the training engine 312 may obtain the global weights 316 by aggregating the model weights 222.

In one example, the training engine 312 may continuously train the global model 310 based on model weights 222 that may be received subsequently, or from reference computing devices 204 which may have previously not provided their respective model weights 222. Accordingly, the global weights 316 may be periodically updated.

In another example, the received sets of model weights 222 may further include a relative factor. The relative factor may be determined based on a relation of the environment-agnostic parameters to the global model 310 and may have an impact on the trained global model 310. For example, it may be the case that one of the reference computing devices in the network may be of an older version and may not contribute to a large extent in providing the training data to the global model 310. In such cases, the relative factor may be used to normalize the contribution of each of the received sets of model weights 222 corresponding to the respective environment agnostic parameters.

Once the global weights 316 are obtained, they may then be communicated to a plurality of testing systems 304. The testing system 304 may implement the first model 212 and the second model 214 (as will be further described in conjunction with FIG. 4). The second model 214 may then be updated based on the global weights 316. In an example, the testing systems 304 may be the target computing devices which is to be monitored or may be coupled to target computing devices which is to be monitored. Thereafter, an anomaly which is likely to occur in the target computing device, may be predicted based on the first model 212 and a second model 214. In an example, the first model 212 and the second model 214 may be a recurrent neural network model. A recurrent neural network may be a neural network which involves providing an output from a previous cycle as input to a current cycle. An example of a recurrent neural network includes, but is not limited to, Long Short-Term Memory (LSTM) based neural networks. The above-mentioned examples of the first model 212 and the second model 214 are only indicative and should not be considered as limiting. For example, neural network model which accounts for historical information may be utilized without deviating from the scope of the present subject matter. The manner in which the first model 212 and the second model 214 are implemented to analyze the current operating parameters of a target computing device to predict occurrence of any anomaly, is further described in conjunction with FIG. 4.

Figure 4:
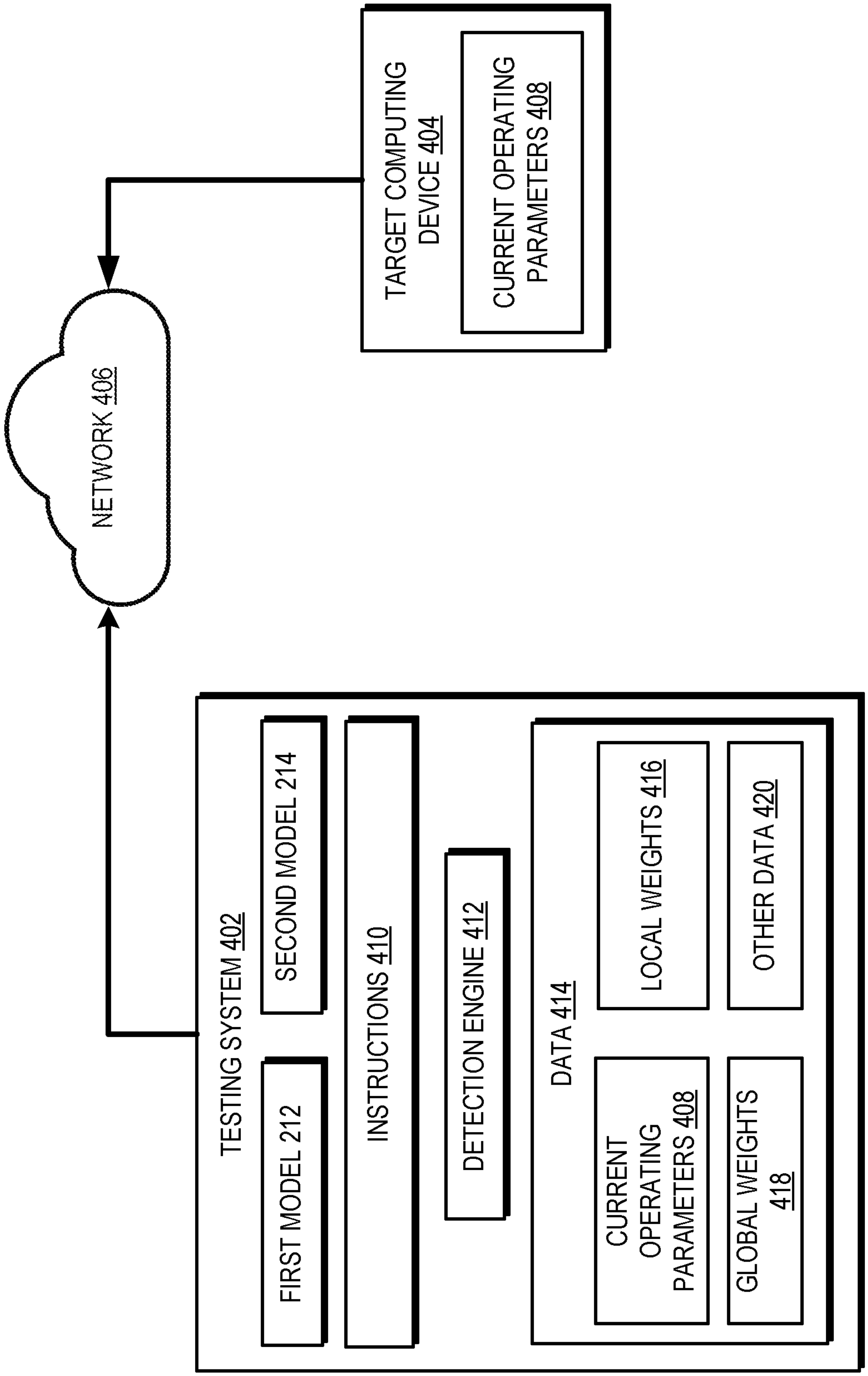
FIG. 4 illustrates a testing system for determining an occurrence of an anomaly in a target computing device, according to an example of the present subject matter.

FIG. 4 illustrates a testing system 402 comprising a processor and memory (not shown), for determining occurrence of an anomalous operation in a target computing device 404. The testing system 402 may further include the first model 212, and the second model 214. In an example, the first model 212 and the second model 214 may have been obtained from a training system, such as the training system 202 (described in FIG. 2). Furthermore, the second model 214 is such that it has been updated based on global weights, such as global weights 316, obtained from a global model, such as the global model 310 implemented in the central computing system 302. In an example, the testing system 402 (referred to as system 402) may be in communication with the target computing device 404 through a network 406. The network 406, in an example, may be similar to the networks 206, 306, as described in FIGS. 2-3. It may be noted that although the testing system 402 is shown as distinct from the target computing device 404, the testing system 402 and the target computing device 404 may be the same device, without deviating from the scope of the present subject matter.

Further, as described previously, any computing device may be operating under different conditions. Such operating conditions may affect the operation of computing device. To such extent, a functional state of the target computing device 404 during the course of its operation may be represented as current operating parameters 408. The current operating parameters 408 may correspond to the current operation of the target computing device 404. For example, the target computing device 404 may be operating under a specific temperature, and at a certain power level. In such case, examples of its current operating parameters 408 may include, temperature and power level of the target computing device 404. The system 402 may further include instructions 410 for determining anomalies that may occur on the target computing device 404, based on a first model 212 and a second model 214.

The system 402 may further include a detection engine 412. The detection engine 412 (referred to as engine 412) may be implemented in a similar manner as engine 216, as described in conjunction with FIG. 2 or engine 312, as described in FIG. 3. The testing system 402 may further include data 414. The data 414 may include current operating parameters 408 as obtained from the target computing devices 404, local weights 416 (which correspond to the first model 212), global weights 418 (which correspond to the second model 214), and other data 420. The other data 420 may be any data that is generated or used by the testing system 402 during its operation.

In operation, the system 402 may receive current operating parameters 408 from the target computing device 404. As described above, the current operating parameters 408 of the target computing device 404 may correspond to the current operations of the target computing device 404 and may include parameters corresponding to real-time operation of the target computing device. The current operating parameters 408 may include a set of environment-related parameters which are affected by local environmental factors or conditions of the target computing device 404 (i.e., the environment-related parameters). The current operating parameters 408 may also include parameters which are less or minimally affected by local environmental factors or conditions of the target computing device 404 (i.e., the environment-related parameters).

The engine 412, may analyze the environment-related parameters of the current operating parameters 408, based on the first model 212, and may analyze the environment-agnostic parameters, based on the second model 214. Based on the analysis, any anomaly in the target computing device 404, based on the current operating parameters 408 may then be determined. In an example, based on the first model 212 and the second model 214 certain operating parameters may be predicted. Such predicted parameters may be compared with the current operating parameters 408. Based on the deviation between the predicted parameters and the current operating parameters 408, occurrence of an anomaly may be ascertained. The present approach is just one of the many other examples that may be used for determining occurrence of an anomaly. Such other approaches may be used without limiting the scope of the present subject matter.

Figure 5:
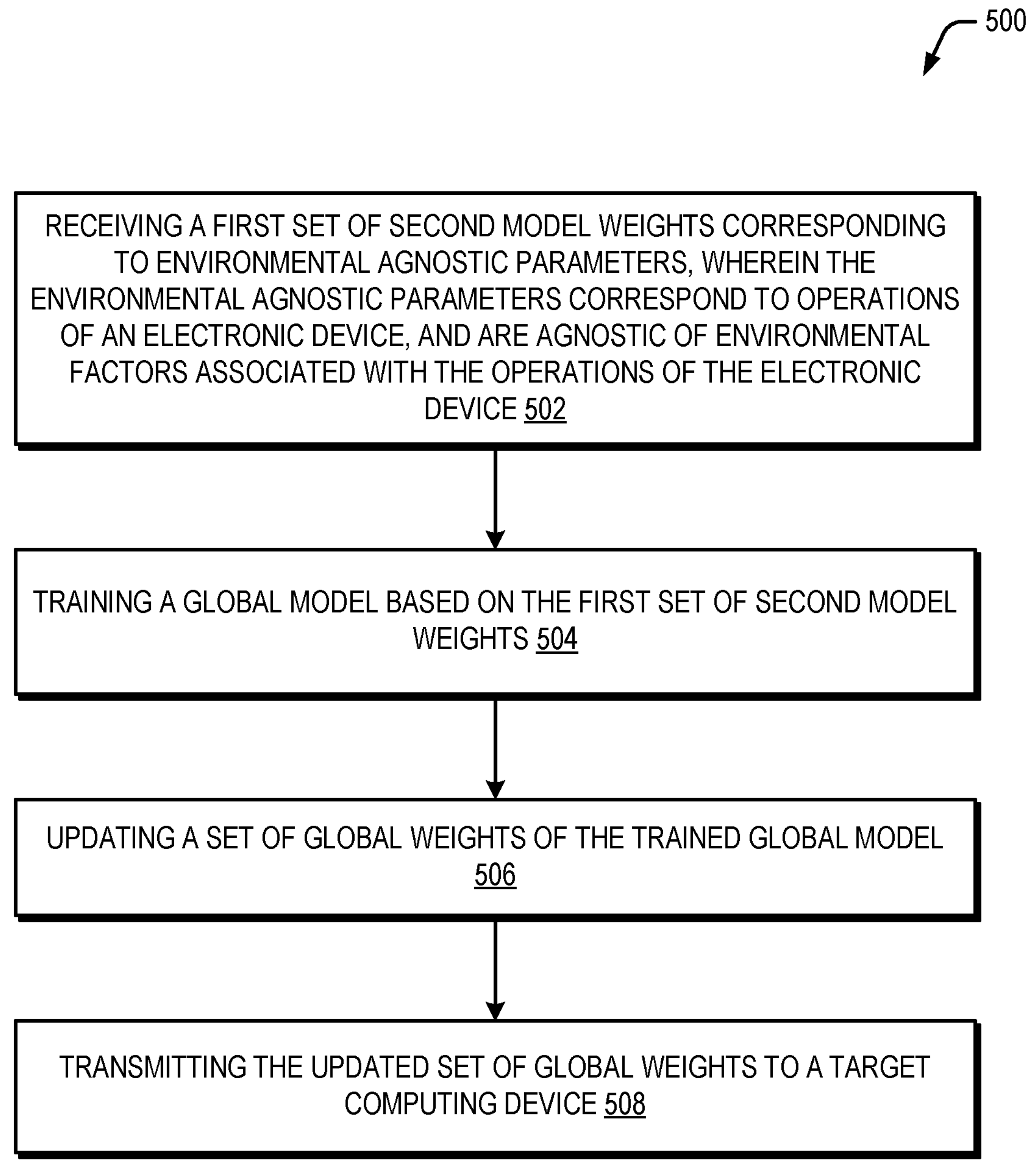
FIG. 5 illustrates an example method for training a global model at a central computing system, in accordance with example of the present subject matter.

FIG. 5 illustrates an example method 500 for training a global model at a central computing system, in accordance with example of the present subject matter. The order in which the above-mentioned method is described is not intended to be construed as a limitation, and some of the described method blocks may be combined in a different order to implement the method, or alternative method.

Furthermore, the above-mentioned method may be implemented in a suitable hardware, computer-readable instructions, or combination thereof. The steps of such method may be performed by either a system under the instruction of machine executable instructions stored on a non-transitory computer readable medium or by dedicated hardware circuits, microcontrollers, or logic circuits. For example, the method 500 may be performed by a central computing system 302. Herein, some examples are also intended to cover non-transitory computer readable medium, for example, digital data storage media, which are computer readable and encode computer-executable instructions, where said instructions perform some or all the steps of the above-mentioned method.

At block 502, a first set of model weights corresponding to environment-agnostic parameters may be received. For example, the central computing system 302 may receive a first set of model weights 222 from a training system 202, through the network 206. The first set of model weights 222 may be derived based on a second model, such as the second model 214. The second model 214 is in turn trained on environment-agnostic parameters, such as environment-agnostic parameters 230 of a reference computing device 204-1. The environment-agnostic parameters 230 may correspond to operations of the reference computing system 204-1 that are less or minimally impacted by the local environment factors or conditions.

At block 504, a global model is trained based on the received first set of model weights. For example, the training engine 312 of the central computing system 302 may train the global model 310 based on the received model weights 222. In an example, the training engine 312 may aggregate the received model weights 222 from the testing systems 304 to determine the global model 310.

At block 506, a set of global weights of the trained global model may be updated. For example, as a result of the training of the global model 310, the weights of the global model may get updated. The updated global weights 316 may be derived from the global model 310. In one example, the central computing system 302 may periodically receive subsequent sets of model weights 222 from the reference computing devices 204. These subsequent sets of model weights 222 may then be used for further training or updating the global model 310. Further training or updating the global model 310 updates the corresponding global weights 316. Once the global weights 316 have been updated, they may be obtained from the global model 310.

At block 508, the updated set of global weights may be transmitted to a testing system. For example, the central computing system 302 may then communicate the global weights 316 to a testing system 402 implementing a first model 212 and a second model 214. The testing system 402 may determine occurrence of anomalies for a target computing device 404, or in another example, may be implemented within the target computing devices. In an example, the global weights 316 may then be utilized for updating the second model 214 which may be present within the testing system 402 (or the target computing device 404, as the case may be). The second model 214, once updated, incorporates the global weights 316. The target computing device 404 may then determine occurrence of an anomaly based on the first model 212 and the second model 214.

Figure 6:
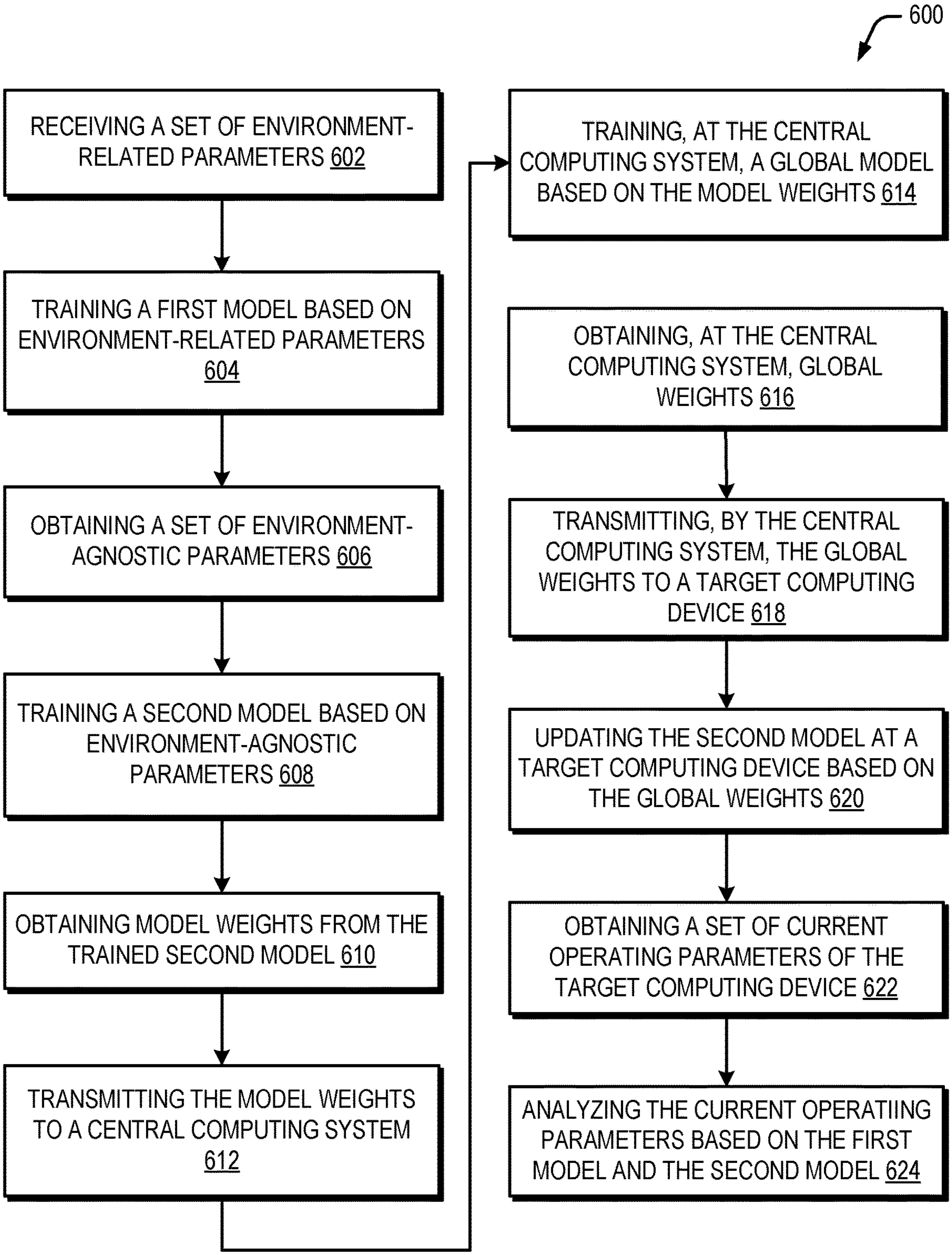
FIG. 6 illustrates another example method for determining an occurrence of an anomaly in a target computing device, in accordance with example of the present subject matter.

FIG. 6 illustrate another example method 600 for training models in target computing devices, in accordance with example of the present subject matter. The order in which the above-mentioned method is described is not intended to be construed as a limitation, and some of the described method blocks may be combined in a different order to implement the method, or alternative method. Furthermore, the above-mentioned method may be implemented in a manner similar as that of method 500.

Based on the present approaches as described in the context of the example method 600, current operating parameters which may correspond to current operation of the target computing device may be analyzed, based on a first model and a second model to determine the occurrence of an anomaly in the target computing device. The present example method illustrates training of a first model and a second model and analyzing the current operational parameters of the target computing device, based on such models. It is pertinent to note that such training and eventual analysis of current operating parameters may not occur in continuity and may be implemented separately without deviating from the scope of the present subject matter.

At block 602, a set of environment-related parameters may be received. For example, the reference computing device 204-1 may generate operating parameters 208 in course of executing various operation of the reference computing device 204. Such operating parameters 208 may include parameters that are affected by local environment factors and conditions (i.e., environment-related parameters 228), as well as parameters which are minimally or unaffected by the local environment factors and conditions (i.e., environment-agnostic parameters 230). Examples of such environment-related parameters 228 may include, but are not limited to, ambient temperature, humidity, or any other parameter corresponding to the environmental conditions under which the reference computing device 204-1 may be operating.

At block 604, a first model may be trained based on the environment-related parameters. For example, the training engine 216 of the training system 202 may train the first model 212 based on the set of environmental specific features 228. When trained, the training engine 216 may update the local weights 220 of the first model 212. In one example, the local weights 220 of the first model 212 may be periodically updated and refined, based on the environmental specific features 228.

At block 606, a set of environment-agnostic parameters may be obtained. For example, environment-agnostic parameters 230 may be determined from the operating parameters 208. The environmental agnostic features 230 may correspond to operations of the reference computing device 204-1, but which may be less or minimally impacted from environmental factors or conditions with the operations of the reference computing devices 204.

At block 608, a second model may be trained based on the environment-agnostic parameters. For example, the training engine 216 may initially train the second model 214 based on the set of environmental agnostic features 230. The second model 214, since being trained on a limited dataset (i.e., the dataset pertaining to the environment-agnostic parameters 230 of the reference computing device 204-1), may be considered as being partially trained.

At block 610, a set of model weights may be obtained from the trained second model. For example, a set of model weights 222 may be obtained from the second model 214, based on the set of environmental agnostic features 230 of the reference computing device 204-1.

At block 612, the model weights may be transmitted to a central computing system. For example, the model weights 222 may be based on the training the second model 214 at the training system 202 and may be communicated to the central computing system 302. As discussed previously, weights, such as model weights 222, are learnable parameters of the second model 214 which are defined based on the training data (which in the present case, is environment-agnostic parameters 230). In an example, model weights 222 for corresponding second models 214 implemented in other computing devices, may be retrieved, and communicated to the central computing system 302.

At block 614, a global model based on the model weights may be trained at a central computing system. For example, the central computing system 302 may cause the training engine 312 to train the global model 310 based on the received model weights 222. In an example, the global weights 316 may be determined by aggregating the received model weights 222.

At block 616, a set of global weights may be obtained from the global model implemented at the central computing system. For example, once trained, global weights 316 may be derived from the trained global model 310. In instances where the central computing system 302 may periodically receive a plurality of model weights 222, the global model 310 may be trained periodically and updated global weights 316 may accordingly derived.

At block 618, the central computing system may transmit the global weights to a target computing device. For example, once determined the global weights 316 may then be communicated to a target computing device 404. In an example, the target computing device 404 may implement a testing system 402 for ascertaining occurrence of an anomaly. In an example, the testing system 402 may be implemented in the target computing device 404. In such a case, the first model 212 and the second model 214 may be implemented in the target computing device 404.

At block 620, the second model at the target computing device may be updated based on the global weights. For example, the target computing device 404, on receiving the global weights 418, may incorporate the global weights 418 into the second model 214. The global weights 316 once incorporated are to update weights of the second model 214. In an example, the present process may be implemented for a plurality of target computing devices, similar to the target computing device 404, wherein corresponding second models 214 within such devices may be updated based on the global weights 316.

At block 622, a set of current operating parameters of a target computing device may be obtained. For example, the testing system 402 may obtain current operating parameters 408 from the target computing device 404. The current operating parameters 408 of the target computing device 404 may correspond to parameters pertaining to operations of the target computing device 404. In an example, the current operating parameters 408 may include parameters that may be affected by local environment conditions and factors (i.e., environment-related parameters), and parameters that are unrelated or minimally affected by local environment conditions and factors (i.e., environment-agnostic parameters).

At block 624, the set of current operating parameters may be analyzed based on the first model and the second model to ascertain occurrence of anomaly. For example, the detection engine 412, may analyze the environment-related parameters of the current operating parameters 408, based on the first model 212. In a similar manner, the detection engine 412 may analyze the environment-agnostic parameters based on the second model 214. In an example, the first model 212 and the second model 214 may be implemented either in the target computing devices, such as the target computing device 404, where the current operating parameters 408 may be analyzed. In another example, the first model 212 and the may be implemented in a testing system, such as the testing system 402 which is in communication with the target computing devices, such as the target computing device 404. In such cases, the testing system 402 may analyze the current operating parameters 408 of the target computing device 404 to determine occurrence of any anomaly.

Figure 7:
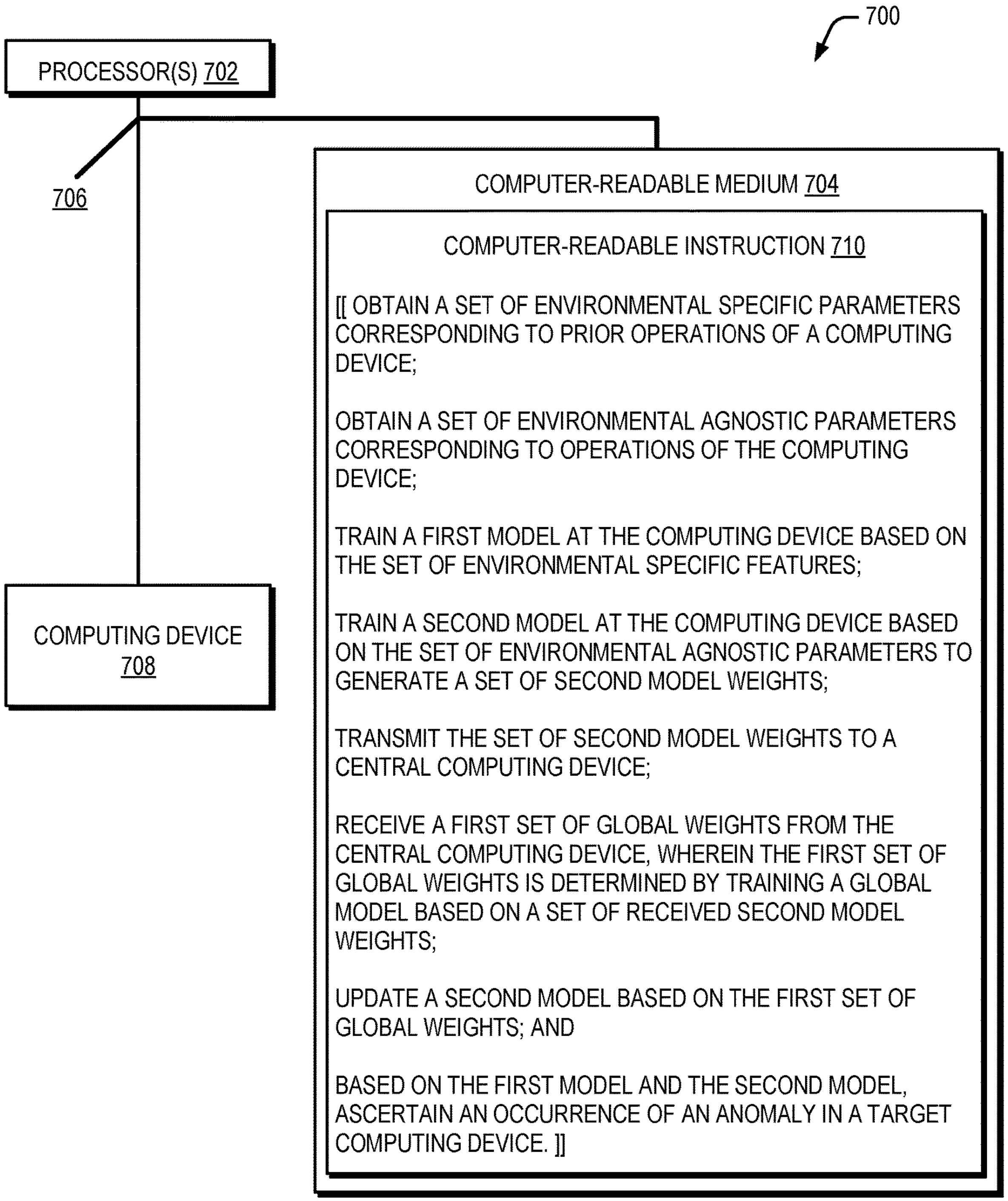
FIG. 7 illustrates a system environment implementing a non-transitory computer readable medium for determining an occurrence of an anomaly in a target computing device, based on a first model and a second model, in accordance with example of the present subject matter.

FIG. 7 illustrates a computing environment 700 implementing a non-transitory computer readable medium for determining an occurrence of an anomaly in a target computing device, such as the target computing device 404, based on a first model and a second model. In an example, the computing environment 700 includes processor(s) 702 communicatively coupled to a non-transitory computer readable medium 704 through a communication link 706. In an example, the processor(s) 702 may have one or more processing resources for fetching and executing computer-readable instructions from the non-transitory computer readable medium 704. The processor(s) 702 and the non-transitory computer readable medium 704 may be implemented, for example, in systems 202, 302, and 402 (as has been described in conjunction with the preceding figures).

The non-transitory computer readable medium 704 may be, for example, an internal memory device or an external memory device. In an example implementation, the communication link 706 may be a network communication link. The processor(s) 702 and the non-transitory computer readable medium 705 may also be communicatively coupled to a computing device 708 over the network.

In an example implementation, the non-transitory computer readable medium 704 includes a set of computer readable instructions 710 which may be accessed by the processor(s) 702 through the communication link 706. Referring to FIG. 7, in an example, the non-transitory computer readable medium 704 includes instructions 710 that cause the processor(s) 702 to obtain a set of operating parameters, such as the operating parameters 208. In an example, the operating parameters 208 may include environment-related parameters 228 (i.e., parameters which affected by local environmental conditions or factors) and environment-agnostic parameters 230 (i.e., parameters that are minimally or unaffected by local environmental conditions or factors).

Once the operating parameters 208 have been obtained, the instructions 710 may cause the processor(s) 702 to train a first model 212 and a second model 214 based on the environment-related parameters 228 and environment-agnostic parameters 230, respectively. With the second model 214 thus trained, the instructions 710 may cause the processor(s) 702 to obtain a set of model weights, such as model weights 222, from the second model 214. With the set of model weights 222 obtained, the instructions 710 may further cause the processor(s) 702 to transmit the set of model weights 222 to a central computing system, such as the central computing system 302. The central computing system 302 may then, based on the model weights 222, train a global model, such as the global model 310. Once the global model 310 is trained, the instructions 710 may cause the processor(s) 702 to obtain global weights 316 from the global model 310. The global model 310 may then be transmitted to a target computing device, such as the target computing device 404, which is implemented with a first model 212 and the second model 214. The instructions 710 may further cause the processor(s) 702 to update the second model 214 based on the global weights 316 received from the central computing system 302. Thereafter, the instructions 710 may be executed which cause the processor(s) to ascertain an occurrence of an anomaly in the target computing device 404 based on the first model 212 and the second model 214.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

The invention claimed is:

1. A system comprising:

a processor;

a machine-readable storage medium comprising instructions executable by the processor to:

obtain a current operating parameter, wherein the current operating parameter corresponds to a current operation of a target additive manufacturing device during a manufacturing process;

analyze the current operating parameter based on a first model and a second model, wherein:

the first model is trained based on a set of environment-related parameters, with the set of environment-related parameters corresponding to prior operations of the target additive manufacturing device; and the second model incorporating a first set of global weights, wherein the first set of global weights is based on a set of environment-agnostic parameters, with the environment-agnostic parameters corresponding to operations of a set of additive manufacturing devices similar to the target additive manufacturing device;

ascertain occurrence of an anomaly based on analysis of the current operating parameter; and in response to ascertaining the occurrence of the anomaly, resolve the anomaly at the target additive manufacturing device to mitigate an adverse impact in the manufacturing process due to the anomaly.

2. The system as claimed in claim 1, wherein the first set of global weights are received from a global model operating on a remotely coupled central computing system.

3. The system as claimed in claim 2, wherein the instructions are executable by the processor to further:

receive a subsequent set of global weights from the global model; and update the second model based on the subsequent set of global weights.

4. The system as claimed in claim 3, wherein the instructions are executable by the processor to further:

validate the subsequent set of global weights based on a predefined rule; and in response to validation, updating the second model based on the validated subsequent set of global weights.

5. The system as claimed in claim 1, wherein the target additive manufacturing device further comprises a sensor for detecting the current operating parameter.

6. The system as claimed in claim 1, wherein the second model comprises a set of model weights corresponding to the environment-agnostic parameters, with the model weights obtained by training the second model implemented on each of the set of additive manufacturing devices which are similar to the target additive manufacturing device.

7. A method comprising:

receiving, by a processor, a first set of model weights derived based on environment-agnostic parameters, wherein the environment-agnostic parameters correspond to operations of computing an additive manufacturing device, and are agnostic of environmental factors associated with the operations of the additive manufacturing device;

training, by the processor, a global model based on the first set of model weights;

updating, by the processor, a set of global weights of the trained global model;

transmitting, by the processor, the updated set of global weights to a target additive manufacturing device;

analyzing a current operating parameter corresponding to a current operation of the target additive manufacturing device during a manufacturing process, based on the trained global model with the updated set of global weights:

ascertaining occurrence of an anomaly based on analysis of the current operating parameter; and in response to ascertaining the occurrence of the anomaly, resolve the anomaly at the target additive manufacturing device to mitigate an adverse impact in the manufacturing process due to the anomaly.

8. The method as claimed in claim 7, wherein the first set of model weights is associated with a relative factor, wherein a value of the relative factor is determined based on a relation of a corresponding first set of environment-agnostic parameters to the global model.

9. The method as claimed in claim 7, wherein the first set of model weights corresponding to the environment-agnostic parameters are obtained from training models.

10. The method as claimed in claim 7, wherein updating the set of global weights further comprises receiving a second set of model weights, wherein the second set of model weights correspond to the environment-agnostic parameters of another additive manufacturing device.

11. The method as claimed in claim 10, wherein the set of global weights are obtained based on determining an average of the first set of model weights and the second set of model weights.

12. The method as claimed in claim 7, wherein the method further comprises:

periodically receiving, by the processor, subsequent sets of model weights from a plurality of additive manufacturing devices;

further updating the set of global weights of the global model based on the subsequent sets of model weights; and communicating the updated set of global weights to each of the plurality of additive manufacturing devices.

13. A non-transitory computer-readable medium storing instructions that are executable by a processor to:

obtain a set of environment-related parameters corresponding to prior operations of an additive manufacturing device;

obtain a set of environment-agnostic parameters corresponding to operations of the additive manufacturing device;

train a first model at the additive manufacturing device based on the set of environment-related parameters;

train a second model at the additive manufacturing device based on the set of environment-agnostic parameters to generate a set of model weights;

transmit the set of model weights to a central computing system;

receive a first set of global weights from the central computing system, wherein the first set of global weights is determined by training a global model based on a set of received model weights;

update the second model based on the first set of global weights;

analyze a current operating parameter corresponding to a current operation of a target additive manufacturing device during a manufacturing process, based on the first model and the second model;

ascertain an occurrence of an anomaly in the target additive manufacturing device based on analysis of the current operating parameter; and in response to ascertaining the occurrence of the anomaly, resolve the anomaly at the target additive manufacturing device to mitigate an adverse impact in the manufacturing process due to the anomaly.

14. The non-transitory computer-readable medium as claimed in claim 13, wherein the instructions are to further update the second model based on a subsequent set of global weights obtained from the global model.

* * * * *